(12) United States Patent
Bourhis et al.

(10) Patent No.: US 11,384,688 B2
(45) Date of Patent: Jul. 12, 2022

(54) AIR INTAKE STRUCTURE FOR AN AIRCRAFT NACELLE COMPRISING AN IMPACT ABSORBER ELEMENT

(71) Applicant: AIRBUS OPERATIONS (S.A.S.), Toulouse (FR)

(72) Inventors: Arnaud Bourhis, Plaisance du Touch (FR); François Pons, Daux (FR); Alain Porte, Colomiers (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 510 days.

(21) Appl. No.: 16/456,500

(22) Filed: Jun. 28, 2019

(65) Prior Publication Data
US 2020/0003119 A1 Jan. 2, 2020

(30) Foreign Application Priority Data
Jun. 29, 2018 (FR) ...................................... 1855967

(51) Int. Cl.
*F02C 7/055* (2006.01)
*B64D 33/02* (2006.01)
(52) U.S. Cl.
CPC .............. *F02C 7/055* (2013.01); *B64D 33/02* (2013.01); *B64D 2033/022* (2013.01)
(58) Field of Classification Search
CPC ... F02C 7/04; F02C 7/05; F02C 7/055; B64D 33/02; B64D 2033/022
See application file for complete search history.

(56) References Cited

U.S. PATENT DOCUMENTS

| 8,899,512 B2 * | 12/2014 | Vauchel ................. | B64D 33/02 244/1 N |
| 2009/0314899 A1 * | 12/2009 | Porte ..................... | B64D 33/02 244/53 B |
| 2010/0181420 A1 * | 7/2010 | Porte ..................... | B64D 33/02 244/1 N |

(Continued)

FOREIGN PATENT DOCUMENTS

| EP | 2 535 271 | 12/2012 |
| FR | 2 925 463 | 6/2009 |
| WO | 2010/086560 | 8/2010 |

OTHER PUBLICATIONS

French Search Report for FR 1855967 dated Mar. 14, 2019, 8 pages.

*Primary Examiner* — Steven M Sutherland
(74) *Attorney, Agent, or Firm* — Nixon & Vanderhye P.C.

(57) ABSTRACT

An air intake structure for a nacelle of an aircraft is disclosed having an air intake lip with a U-shaped section open towards the rear, an acoustic panel that extends the air intake lip towards the rear and on an inner side, an outer panel extending the air intake lip towards the rear and on an outer side, and a rear strengthening frame fixed between the outer panel and the acoustic panel, where the rear strengthening frame partly defines an inner volume that is immediately in front of the rear strengthening frame. The air intake structure comprises an impact absorber element positioned in the inner volume and the impact absorber element assumes the form of a structure that is deformable during an impact and that is at least partially filled with a fluid. The impact absorber element is a flexible shroud filled with a pressurized gas.

10 Claims, 3 Drawing Sheets

(56) References Cited

U.S. PATENT DOCUMENTS

2014/0255202 A1* 9/2014 Kling .................... F02C 7/05
  416/245 R
2018/0297713 A1* 10/2018 Schrell .................. B64D 33/02

* cited by examiner

AIR INTAKE STRUCTURE FOR AN AIRCRAFT NACELLE COMPRISING AN IMPACT ABSORBER ELEMENT

CROSS REFERENCE TO RELATED APPLICATION

This application claims priority to and incorporates by reference French Patent Application Number 1855967, filed Jun. 29, 2018.

TECHNICAL FIELD

The present invention relates to an air intake structure for an aircraft nacelle, where the air intake structure comprises an impact absorber element, an aircraft nacelle comprising such an intake structure, as well as to an aircraft comprising at least one such nacelle.

DESCRIPTION OF THE RELATED ART

An aircraft engine comprises a nacelle, in which the engine itself is housed. The nacelle, which assumes an annular shape, has an air intake structure 700 at the front, a cross-section of which is shown in FIG. 7.

In particular, the purpose of the air intake structure 700 is to ensure the aerodynamic flow of air, on the one hand, towards the fan ducting 702 and, on the other hand, towards the outside of the nacelle.

The air intake structure 700 comprises an air intake lip 704, a front strengthening frame 706, a rear strengthening frame 708, an acoustic panel 710 and an outer panel 712.

The air intake lip 704 has a U-shaped section open towards the rear. It forms the outer shroud of the front part of the air intake structure 700 and it ensures that the air is split between the part that enters the fan ducting 706 and the part that flows around the nacelle.

The front strengthening frame 706 also has a U-shaped section open towards the rear and it is placed inside and behind the air intake lip 704. The front strengthening frame 706 provides the mechanical strength for the front part of the nacelle and helps to maintain the shape and the size thereof.

The outer panel 712 extends the air intake lip 704 on the outer side and forms an outer face in contact with the outside air.

The acoustic panel 710 forms an inner shroud of the nacelle and defines a duct 702 that forms the fan ducting. The acoustic panel 710 is disposed behind the air intake lip 704, on the side of the fan ducting 702.

The acoustic panel 710 has a structure that is able to attenuate the noises produced by the engine, and in particular by the fan.

In general, the space 718 between the air intake lip 704 and the front strengthening frame 706 is pressurized with hot air in order to de-ice the air intake lip 704.

The front strengthening frame 706 and the air intake lip 704 are fixed in the vicinity of an outer fixing zone 714.

The front strengthening frame 706 and the air intake lip 704 are fixed in the vicinity of an inner fixing zone 716.

Even though such an air intake structure 700 proves to be entirely satisfactory when it is used, during a flight of the aircraft it is possible for a bird to strike the air intake lip 704. The air intake lip 704 then can be perforated and the bird is stopped by the front strengthening frame 706. In extremely rare cases, it is possible for the bird to also perforate the front strengthening frame 706 at the risk of also deforming the rear strengthening frame 708.

Furthermore, the fixing zones 714 and 716 for the front strengthening frame 706 generate aerodynamic disruption.

SUMMARY

The present disclosure provides an air intake structure that comprises an impact absorber element limiting the impact of a bird passing through the air intake lip.

Moreover, the air intake structure is proposed for a nacelle of the aircraft, the air intake structure comprising:

an air intake lip with a U-shaped section open towards the rear;

an acoustic panel that extends the air intake lip towards the rear and on an inner side;

an outer panel that extends the air intake lip towards the rear and on an outer side;

a rear strengthening frame fixed between the outer panel and the acoustic panel, where the rear strengthening frame partly defines an inner volume that is immediately in front of the rear strengthening frame, and;

an impact absorber element positioned in the inner volume, where the impact absorber element assumes the form of a structure that is deformable during an impact and that is at least partially filled with a fluid, the air intake structure being characterized in that the impact absorber element is a flexible shroud filled with a pressurized gas.

Placing an impact absorber element at the front of the rear strengthening frame limits the impact of a body on this rear strengthening frame when the body penetrates the air intake structure.

According to an exemplary embodiment, the flexible shroud fills the inner volume.

According to an exemplary embodiment, the flexible shroud fills partially the inner volume.

According to an exemplary embodiment, the flexible shroud assumes the form of a torus that is pressed and fixed against the rear strengthening frame.

The air intake structure may comprise a front frame, the section of which assumes the shape of a U open towards the rear and placed inside and behind the air intake lip, and the impact absorber element is disposed between the front frame and the rear strengthening frame.

According to an exemplary embodiment, the flexible shroud is equipped with a discharge means that is intended to discharge the gas from the flexible shroud when the pressure in the flexible shroud exceeds a threshold.

The disclosure is also directed toward a nacelle for an aircraft engine and having an air intake structure according to any of the aforementioned variants.

The disclosure is also directed toward an aircraft comprising at least one nacelle according to the aforementioned variant.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF EMBODIMENTS

Some embodiments will now be described with reference to the Figures.

Figure 1:
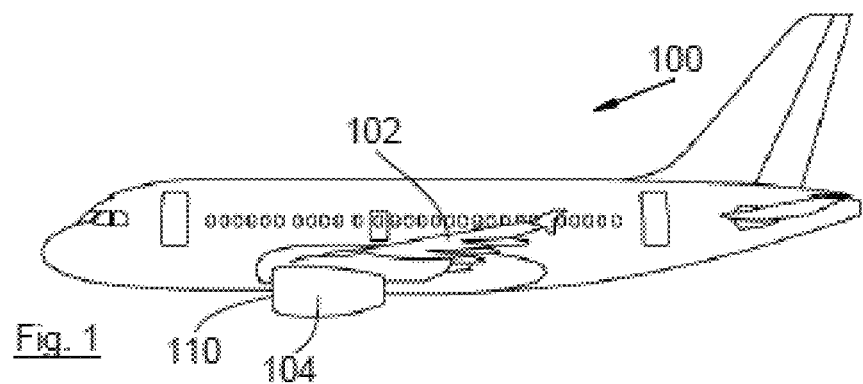
FIG. 1 is a side view of an aircraft having an air intake structure according to the invention.

FIG. 1 shows an aircraft 100 that has a wing 102 and a nacelle 104 under the wing, which nacelle houses an engine.

By convention, the terms "front" and "rear" are used throughout the document taking the front and the rear of the engine as a reference, which also corresponds to the front and the rear of the aircraft 100.

The front of the nacelle 104 has an air intake structure 110 according to the invention.

Figure 2:
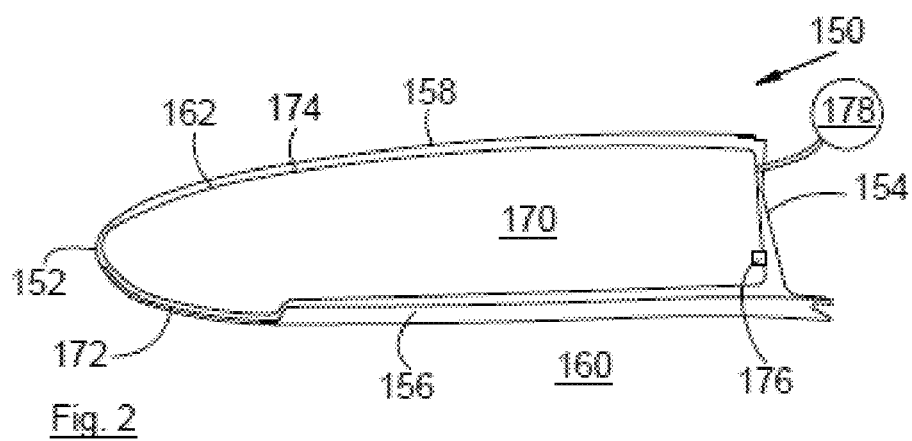
FIG. 2 is a sectional view of an air intake structure according to a first embodiment of the invention.
Figure 3:
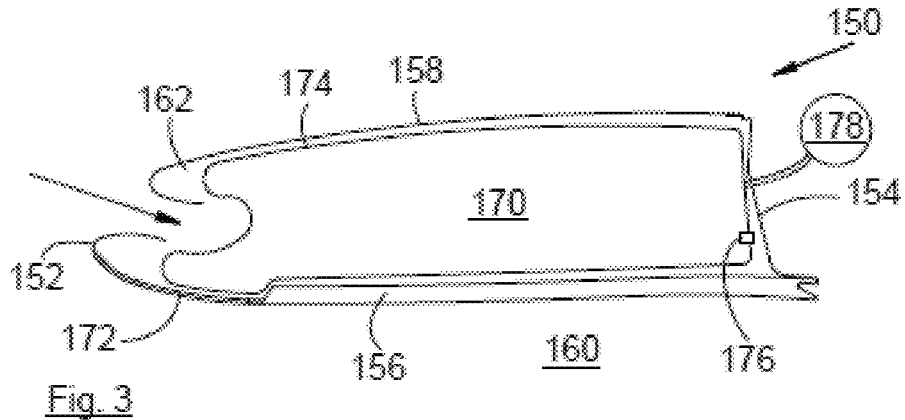
FIG. 3 is a view similar to FIG. 2 when a body penetrates the air intake structure following an impact.
Figure 4:
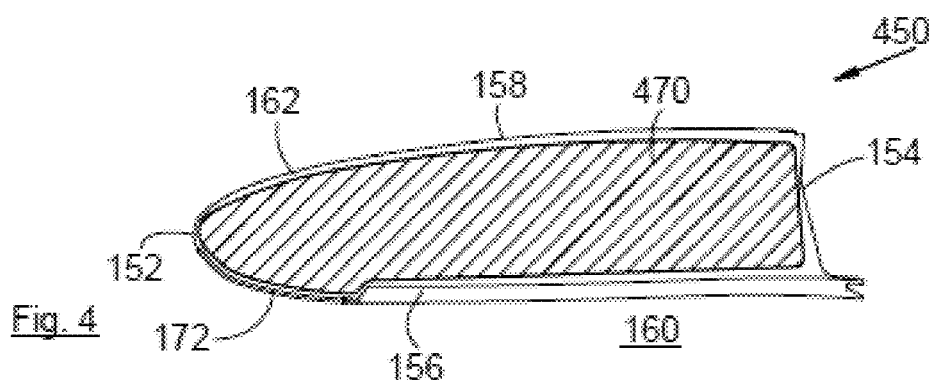
FIG. 4 is a sectional view of an air intake structure according to a second embodiment of the invention.
Figure 5:
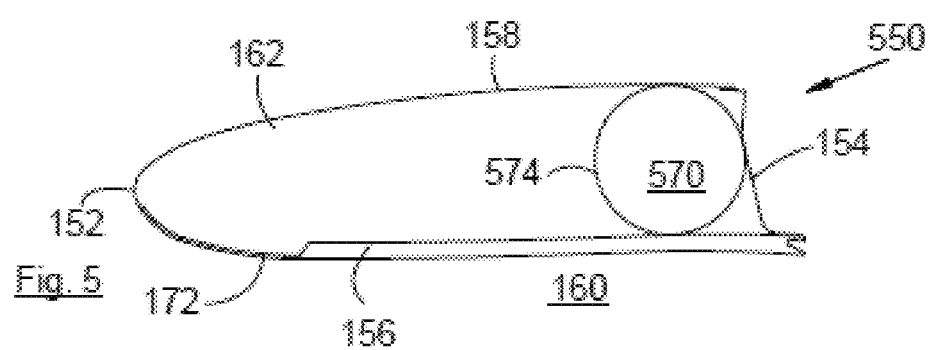
FIG. 5 is a section view of an air intake structure according to a third embodiment of the invention.
Figure 6:
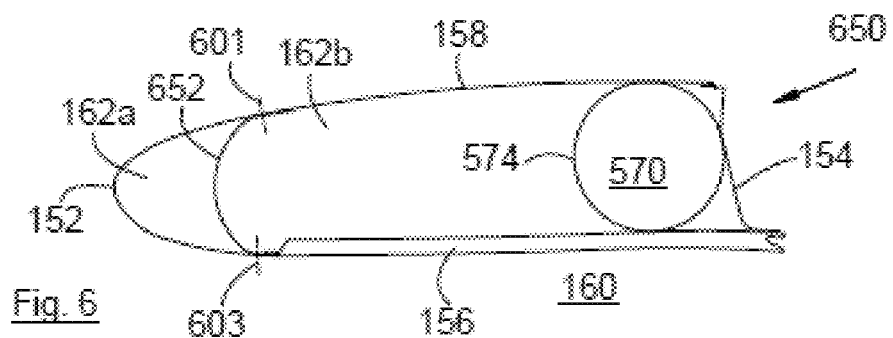
FIG. 6 is a section view of an air intake structure according to a fourth embodiment of the invention.
Figure 7:
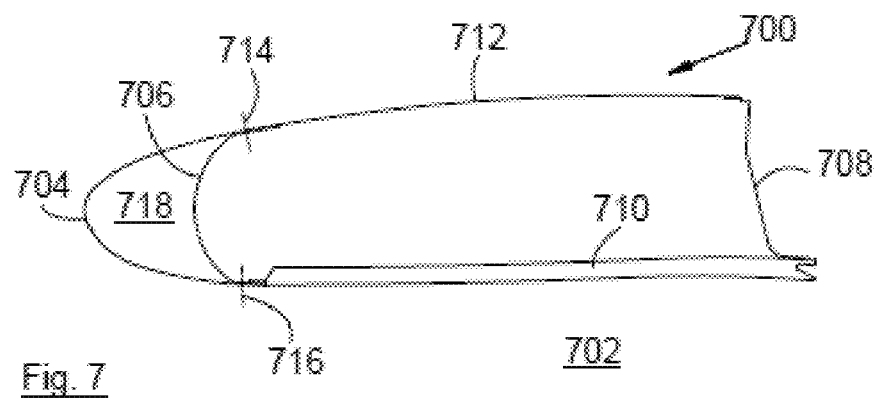
FIG. 7 is a section view of an air intake structure of the prior art.

FIG. 2 and FIG. 3 show a section view of an air intake structure 150 according to a first embodiment of the invention. FIG. 4 shows a section view of the air intake structure 450 according to a second embodiment of the invention. FIG. 5 shows a section view of the air intake structure 550 according to a third embodiment of the invention. FIG. 6 shows a section view of the air intake structure 650 according to a fourth embodiment of the invention.

The general structure of the air intake structure 110, 150, 450, 550, 650 according to an exemplary embodiment comprises an air intake lip 152, a rear strengthening frame 154, an acoustic panel 156 and an outer panel 158.

The air intake lip 152 has a U-shaped section open towards the rear, forms the outer shroud of the front part of the air intake structure 150, 450, 550, 650 and splits the air between the air that flows towards the outside of the nacelle 104 and the air that flows towards the inside of the nacelle 104.

The outer panel 158 extends the air intake lip 152 towards the rear and the outer side and forms a generally cylindrical outer face in contact with the outside air.

The acoustic panel 156 forms a generally cylindrical inner shroud of the nacelle 104 and defines a duct 160 that forms a fan ducting. The acoustic panel 156 extends the air intake lip 152 towards the rear and the inner side, i.e. on the side of the fan ducting 160.

Within the scope of the first, second and third embodiments of the invention, the air intake lip 152, the outer panel 158, the acoustic panel 156 and the rear strengthening frame 154 are fixed together and define an inner volume 162 of the air intake structure 150, 450, 550. The rear strengthening frame 154 is fixed between the outer panel 158 and the acoustic panel 156 and is positioned behind the air intake structure 150, 450, 550, 650.

Furthermore, in these embodiments, there is no front strengthening frame, and therefore there are no longer any zones for fixing the frame to the air intake lip, resulting in an improvement to the aerodynamic profile.

Referring to the air structure 650 shown in FIG. 6, the air intake structure 650 also comprises a front frame 652 that has a U-shaped section open towards the rear and it is placed inside and behind the air intake lip 152. The air intake lip 152, the outer panel 158, the acoustic panel 156, the front frame 652 and the rear strengthening frame 154 are fixed together and define a front inner volume 162a and a rear inner volume 162b. The front inner volume 162a is defined between the air intake lip 152 and the front frame 652 and the rear inner volume 162b is defined between the front frame 652, the outer panel 158, the acoustic panel 156 and the rear strengthening frame 154. In this case, the front frame 652 and the air intake lip 152 are fixed in the vicinity of an outer fixing zone 601 and an inner fixing zone 603.

In each embodiment of the invention, the air intake structure 150, 450, 550, 650 comprises an impact absorber element 170, 470, 570 that is positioned in the inner volume 162, 162b that is immediately in front of the rear strengthening frame 154, i.e. that is partly defined by the rear strengthening frame 154. The impact absorber element 170, 470, 570 assumes the shape of a deformable structure that deforms during an impact.

The deformable structure is at least partially filled with a fluid in liquid or gas form.

Referring to the embodiments of FIGS. 2, 4, and 5, de-icing of the air intake lip 152 is provided by an electrical system 172 that is positioned against the wall of the air intake lip 152 and that is electrically powered by an electric generator of the aircraft 100.

Referring to the embodiment shown in FIG. 6, deicing of the air intake lip 152 is provided in the same way as in the prior art, i.e. by pressurizing with hot air in the front inner volume 162a.

Referring to embodiment shown in FIGS. 2 and 3, the impact absorber element 170 is a flexible shroud 174 filled with a pressurized gas, such as helium, propellant or argon, for example. The flexible shroud 174 fills the inner volume 162. When a bird strikes and penetrates the air intake lip 152 (see, FIG. 3), the progress of the bird is stopped by the flexible shroud 174, which deforms and absorbs the impact before the energy is transferred to the rear strengthening frame 154 and deforms the frame.

In order to allow deflation of the flexible shroud 174 under the impact, the shroud is equipped with a discharge means 176 that allows the gas to be discharged from the flexible shroud 174 when the pressure in the flexible shroud 174 exceeds a threshold. The discharge means 176 assumes the form of a valve, a vent or a porous membrane, for example. The value of the threshold is determined relative to the overpressure generated by an impact with a bird.

During a maintenance operation, a pump 178 can be connected in order to check the pressure inside the flexible shroud 174 and re-inflate the shroud if necessary.

In order to regulate the pressure inside the flexible shroud 174, the air intake structure 150 comprises a pump 178 that allows the flexible shroud 174 to be supplied with pressurized gas. Thus, during take-off and landing phases, during which the risk of an impact with a bird is greatest, the flexible shroud 174 is inflated to a higher pressure that provides impact resistance.

In flight, the pressure and the temperature result in an increase in the volume of the flexible shroud 174. This increase is managed by virtue of the flexible shroud 174 material and the selected gas. The increase is computed in order to allow the flexible shroud 174 to inflate sufficiently to support the aerodynamic profile of the air intake structure 150 in order to improve the laminarity. The flexible shroud 174 is produced, for example, from PA (polyamide) or from PET (polyethylene terephthalate) or any other suitable materials.

To the extent that the flexible shroud 174 fills the inner volume 162, it does not need to be fixed, but it can be fixed, to the air intake lip 152, to the acoustic panel 156, to the outer panel 158 or to the rear strengthening frame 154.

In the embodiment shown in FIG. 4, the impact absorber element 470 is a foam block formed by cells filled with the fluid and when a bird strikes and penetrates the air intake lip 152, the progress of the bird is stopped by the foam block, which deforms and absorbs the impact.

In the embodiments shown in FIGS. 5 and 6, the impact absorber element 570 is also a flexible shroud 574 filled with a pressurized gas.

The flexible shroud 574 does not completely fill the inner volume 162, 162b and remains pressed and fixed against the rear strengthening frame 154. The flexible shroud 574 assumes the form of a torus.

In the embodiment shown in FIG. 6, the impact absorber element 570 is disposed between the front frame 652 and the rear strengthening frame 154.

In all the embodiments, the transference of the forces from the impact absorber element 170, 470, 570 to the outer panel 158, to the acoustic panel 156 and to the rear strengthening frame 154 in the event of impacts occurs differently as a function of the position of the impact absorber element 170, 470, 570 relative to the elements.

If the distance between the impact absorber element 170, 470 and the outer panel 158, on the one hand, and the distance between the impact absorber element 170, 470 and the acoustic panel 156, on the other hand, are relatively high compared to the distance between the impact absorber element 170, 470 and the rear strengthening frame 154, the forces will be transferred to the rear strengthening frame 154, which is then sized accordingly.

If the distance between the impact absorber element 170, 470 and the outer panel 158, on the one hand, and the distance between the impact absorber element 170, 470 and the acoustic panel 156, on the other hand, are relatively low compared to the distance between the impact absorber element 170, 470 and the rear strengthening frame 154, the forces will be transferred to the outer panel 158 and to the acoustic panel 156 over the entire circumference of the impact absorber element 170, 470.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air intake structure for a nacelle of an aircraft, comprising:
   an air intake lip having a U-shaped open section towards a rear end thereof;
   an acoustic panel extending from the air intake lip towards the rear and on an inner side;
   an outer panel extending from the air intake lip towards the rear and on an outer side;
   a rear strengthening frame fixed between the outer panel and the acoustic panel, where the rear strengthening frame partly defines an inner volume that is immediately in front of the rear strengthening frame, and
   an impact absorber element positioned in and bounded within the inner volume between the reat strengthening frame and the air intake lip, where the impact absorber element assumes the form of a structure that is deformable during an impact, and
   wherein the impact absorber element is a flexible shroud filled with a pressurized gas that deforms and absorbs the impact before the energy is transferred to the rear strengthening frame.

2. The air intake structure according to claim 1, wherein the flexible shroud partially fills the inner volume.

3. The air intake structure according to claim 2, wherein the flexible shroud assumes the form of a torus that is pressed and fixed against the rear strengthening frame.

4. The air intake structure according to claim 3, further comprising a front frame having a section which assumes the shape of a U open towards the rear and placed inside and behind the air intake lip, and in that the impact absorber element is disposed between the front frame and the rear strengthening frame.

5. The air intake structure according to claim 1, wherein the flexible shroud comprises a discharge means for discharging the gas from the flexible shroud when the pressure in the flexible shroud exceeds a threshold.

6. A nacelle for an aircraft engine comprising an air intake structure according to claim 1.

7. An aircraft comprising at least one nacelle according to claim 6.

8. The air intake structure according to claim 1, wherein the flexible shroud further comprises a valve, a vent, or a porous membrane for discharging the gas from the flexible shroud when the pressure in the flexible shroud exceeds a threshold.

9. An air intake structure for a nacelle of an aircraft, comprising:
   an air intake lip having a U-shaped open section towards a rear end thereof;
   an acoustic panel extending from the air intake lip towards the rear and on an inner side;
   an outer panel extending from the air intake lip towards the rear and on an outer side;
   a rear strengthening frame fixed between the outer panel and the acoustic panel, where the rear strengthening frame partly defines an inner volume that is immediately in front of the rear strengthening frame; and
   an impact absorber element positioned in the inner volume, where the impact absorber elemenet assumes the form of a structure that is deformable during an impact,
   wherein the impact absorber element is a flexible shroud filled with a pressurized gas, and
   wherein the flexible shroud completely fills the inner volume.

10. An aircraft nacelle air intake structure, comprising:
   an arcuate air intake portion;
   an acoustic panel extending from the arcuate air intake portion to a rear portion of the air intake structure;
   an outer panel extending from the arcuate air intake portion toward a rear portion of the air intake structure;
   a frame attached to the outer panel and the acoustic panel, wherein the frame partly defines an inner volume bounded by the outer panel and the acoustic panel,
   an impact absorber element disposed within the inner volume and bounded between the frame and the arcuate air intake portion conforming to the shape of the air intake structure, wherein the impact absorber element is at least partially filled with fluid or pressurized gas, and is deformable during an impact of the intake structure by an external object and absorbs the impact before the energy is transferred to the frame.

* * * * *